(12) United States Patent
Cai et al.

(10) Patent No.: US 8,334,043 B2
(45) Date of Patent: Dec. 18, 2012

(54) CEMENT TO MAKE THERMAL SHOCK RESISTANT CERAMIC HONEYCOMB STRUCTURES AND METHOD TO MAKE THEM

(75) Inventors: Jun Cai, Midland, MI (US); Aleksander Jozef Pyzik, Midland, MI (US); Kwanho Yang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 757 days.

(21) Appl. No.: 12/407,468

(22) Filed: Mar. 19, 2009

(65) Prior Publication Data

US 2009/0239030 A1 Sep. 24, 2009

Related U.S. Application Data

(60) Provisional application No. 61/038,266, filed on Mar. 20, 2008.

(51) Int. Cl.
*B32B 3/12* (2006.01)
*B32B 37/12* (2006.01)
*C04B 35/44* (2006.01)
*C04B 35/16* (2006.01)

(52) U.S. Cl. ............... 428/116; 55/523; 55/524

(58) Field of Classification Search .................. None
See application file for complete search history.

(56) References Cited

U.S. PATENT DOCUMENTS

| | | | |
|---|---|---|---|
| 4,304,585 A | 12/1981 | Oda et al. | |
| 4,329,162 A | 5/1982 | Pitcher, Jr. | |
| 4,335,783 A | 6/1982 | McBrayer et al. | |
| 4,416,676 A | 11/1983 | Montierth | |
| 4,417,908 A | 11/1983 | Pitcher, Jr. | |
| 4,642,210 A | 2/1987 | Ogawa et al. | |
| 4,652,286 A | 3/1987 | Kusuda et al. | |
| 4,953,627 A | 9/1990 | Ito et al. | |
| 5,098,455 A | 3/1992 | Doty et al. | |
| 5,173,349 A | 12/1992 | Yavuz et al. | |
| 5,194,154 A | 3/1993 | Moyer et al. | |
| 5,198,007 A | 3/1993 | Moyer et al. | |
| 5,322,537 A | 6/1994 | Nakamura et al. | |
| 5,340,516 A | 8/1994 | Yavuz et al. | |
| 5,629,067 A | 5/1997 | Kotani et al. | |

(Continued)

FOREIGN PATENT DOCUMENTS

EP 1508356 B1 2/2006

(Continued)

OTHER PUBLICATIONS

Akhavan, A.C., "The Quartz Page: The Silica Group", Feb. 4, 2008, www.quartzpage.de/gen_mod.html, Accessed Nov. 1, 2011.*

(Continued)

*Primary Examiner* — David Sample

(57) ABSTRACT

A ceramic honeycomb structure comprised of at least two separate smaller ceramic honeycombs that have been adhered together by a cement comprised of inorganic fibers and a binding phase wherein the smaller honeycombs and fibers are bonded together by the binding phase which is comprised of an amorphous silicate, aluminate or alumino-silicate glass and the cement has at most about 5% by volume of other inorganic particles. The cement may be made in the absence of other inorganic and organic additives while achieving a shear thinning cement, for example, by mixing oppositely charged inorganic binders in water together so as to make a useful cement for applying to the smaller honeycombs to be cemented.

16 Claims, 15 Drawing Sheets

U.S. PATENT DOCUMENTS

| | | |
|---|---|---|
| 5,914,187 A | 6/1999 | Naruse et al. |
| 6,306,335 B1 | 10/2001 | Wallin et al. |
| 6,596,665 B2 | 7/2003 | Wallin et al. |
| 6,596,666 B1 | 7/2003 | Yamada |
| 6,669,751 B1 | 12/2003 | Ohno et al. |
| 6,797,666 B2 | 9/2004 | Harada et al. |
| 7,083,842 B2 | 8/2006 | Masukawa et al. |
| 7,112,233 B2 | 9/2006 | Ohno et al. |
| 7,651,755 B2 | 1/2010 | Yoshida |
| 2001/0038810 A1 | 11/2001 | Wallin et al. |
| 2004/0020359 A1 | 2/2004 | Koermer et al. |
| 2005/0272602 A1* | 12/2005 | Ninomiya ................ 502/439 |
| 2006/0216466 A1 | 9/2006 | Yoshida |
| 2006/0292330 A1 | 12/2006 | Ohno et al. |
| 2007/0128405 A1* | 6/2007 | Sakaguchi et al. ........ 428/116 |
| 2009/0041975 A1* | 2/2009 | Kodama et al. ........... 428/116 |

FOREIGN PATENT DOCUMENTS

| | | |
|---|---|---|
| EP | 1142619 B1 | 1/2007 |
| EP | 1508355 B1 | 1/2007 |
| JP | 6-47620 | 6/1994 |
| WO | WO03/051488 A1 | 6/2003 |
| WO | WO03/082773 A1 | 10/2003 |
| WO | WO 03082773 A1 * | 10/2003 |
| WO | WO2004/011124 A1 | 2/2004 |
| WO | WO2004/011386 A1 | 2/2004 |
| WO | WO 2007116665 A1 * | 10/2007 |

OTHER PUBLICATIONS

Unifrax Product Information Sheet, Isofrax® 1260C Fiber, 2002, 2 pages, Unifrax Corporation, Niagara Falls, New York 14305-2413.

* cited by examiner

Figure 3. Four-point bend load-displacement plots of Example 1 and Comp. Example 1.
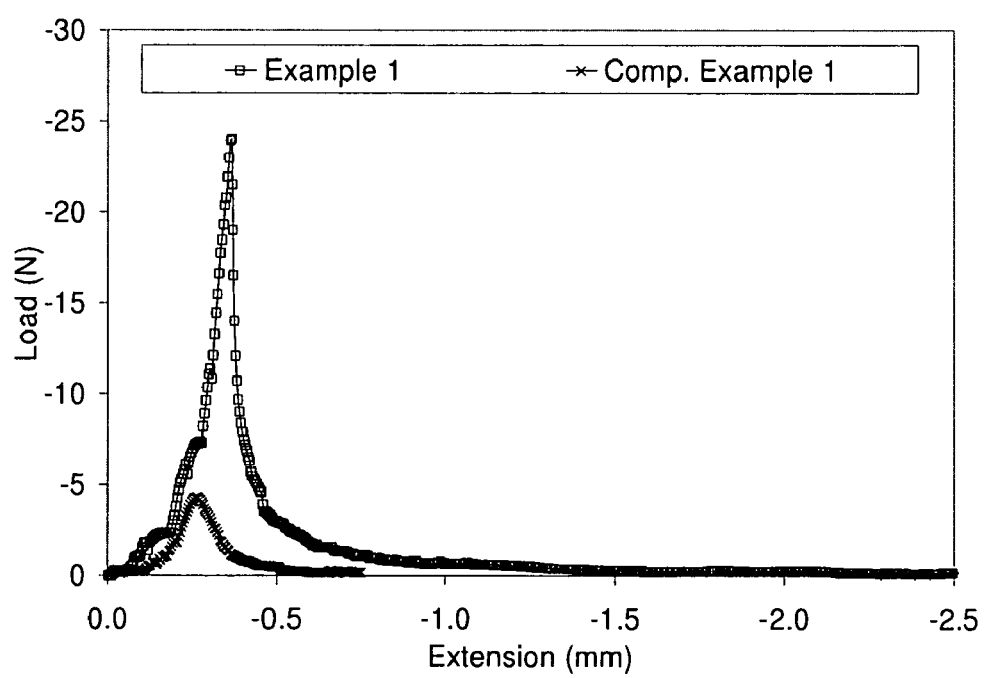

Figure 4. Four-point bend load-displacement plots of Examples 2-5.
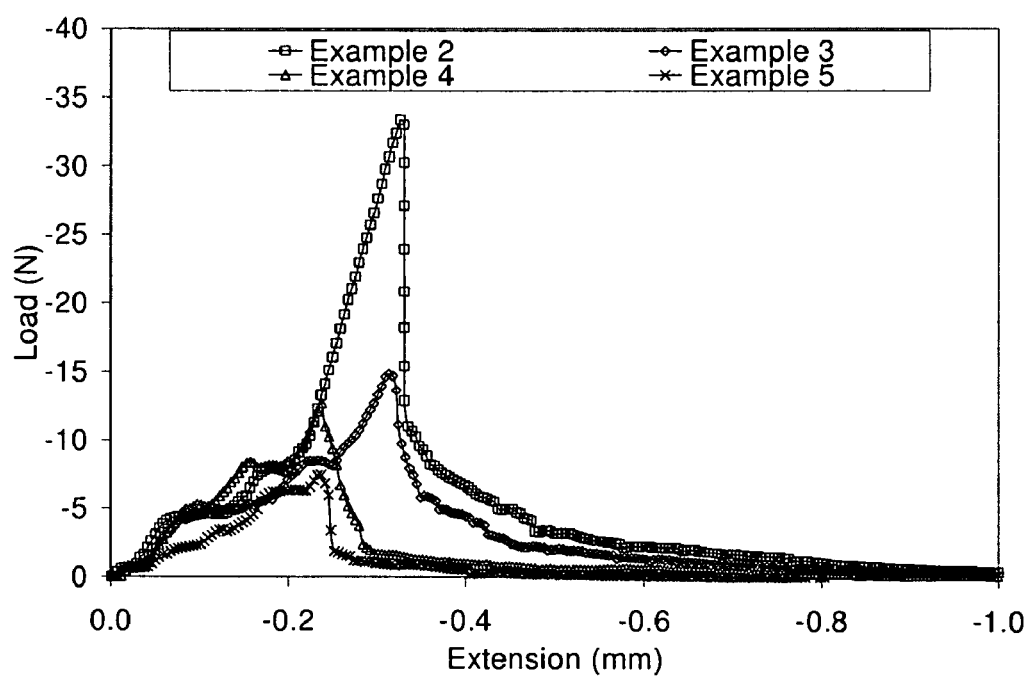

Figure 5. Four-point bend load-displacement plots of Examples 6-8.
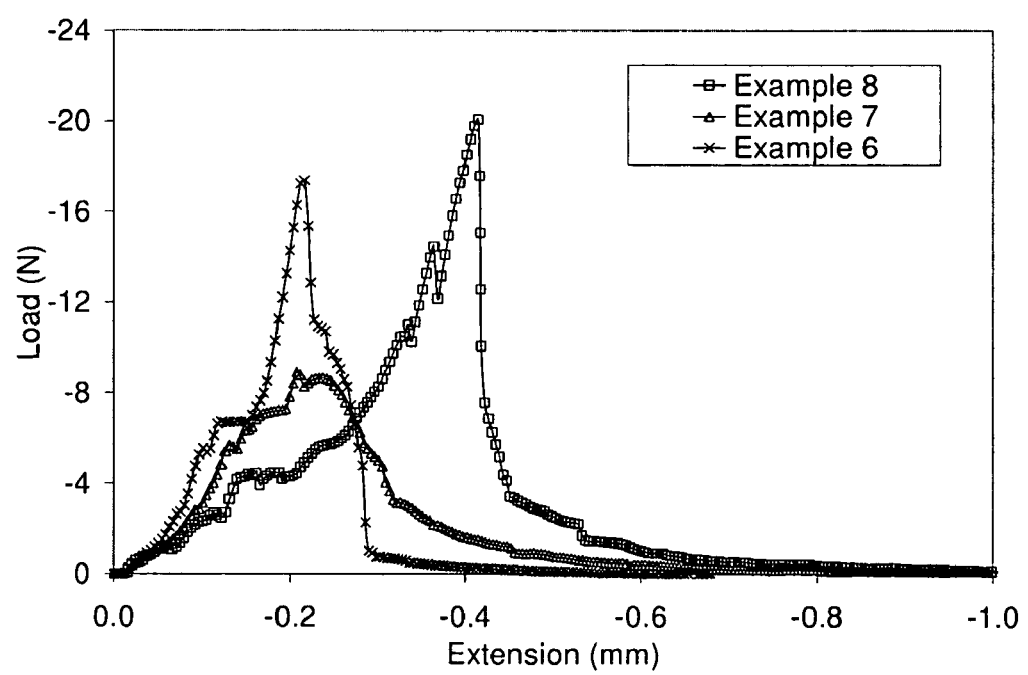

Figure 6. Four-point bend load-displacement plots of Examples 9 and 10.
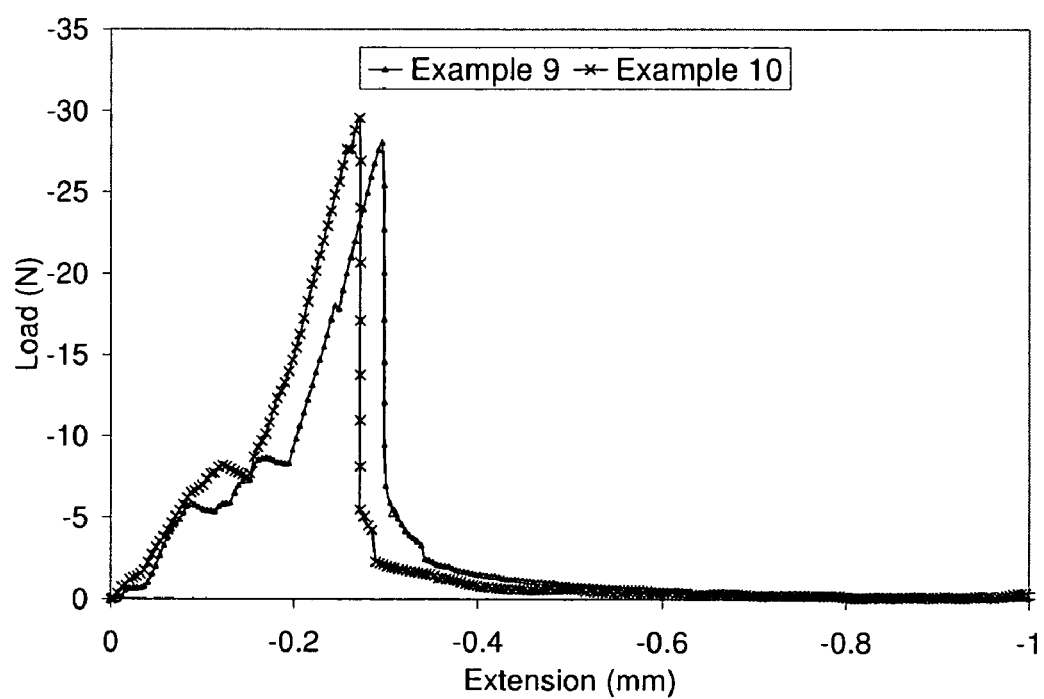

Figure 7. Four-point bend testing load-displacement plots of Example 11 and Comp. Example 1.
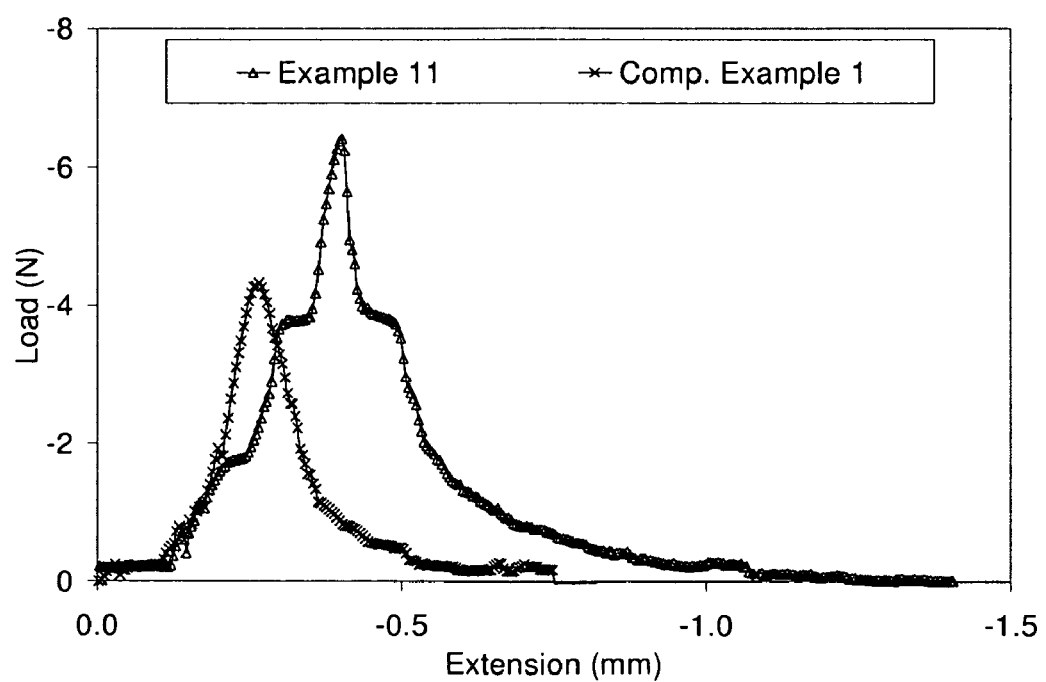

Figure 8. Four-point bend load-displacement plots of Example 12 and Comp. Example 1
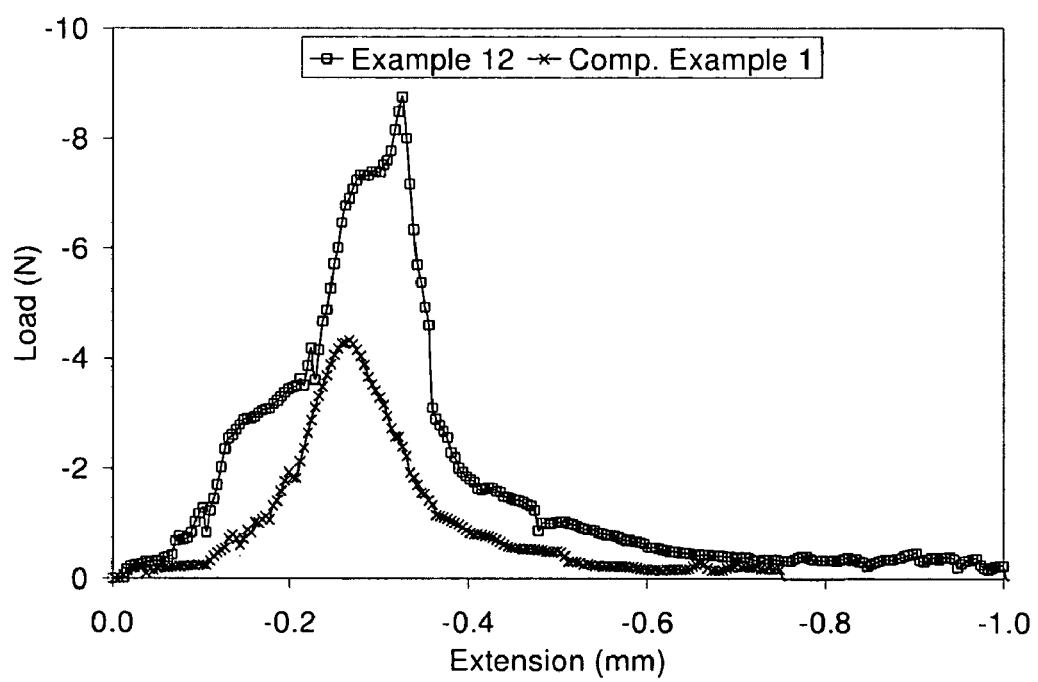

Figure 9. Four-point bend load-displacement plots of Example 13 and Comp. Example 1.
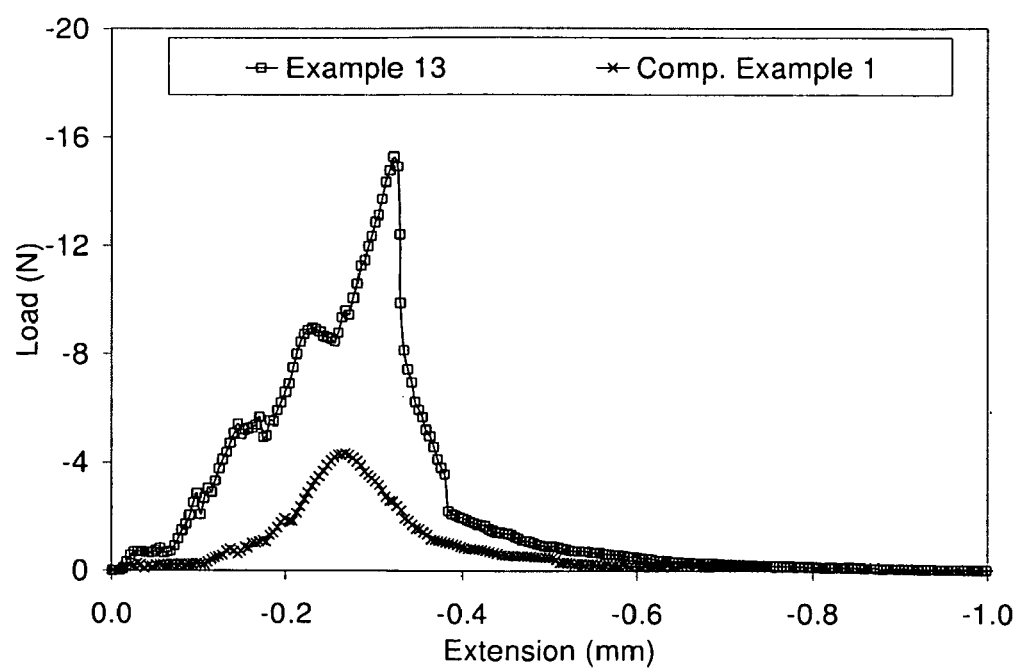

Figure 10. Four-point bend testing load-displacement plots of Example 14 and Comp. Example 1.
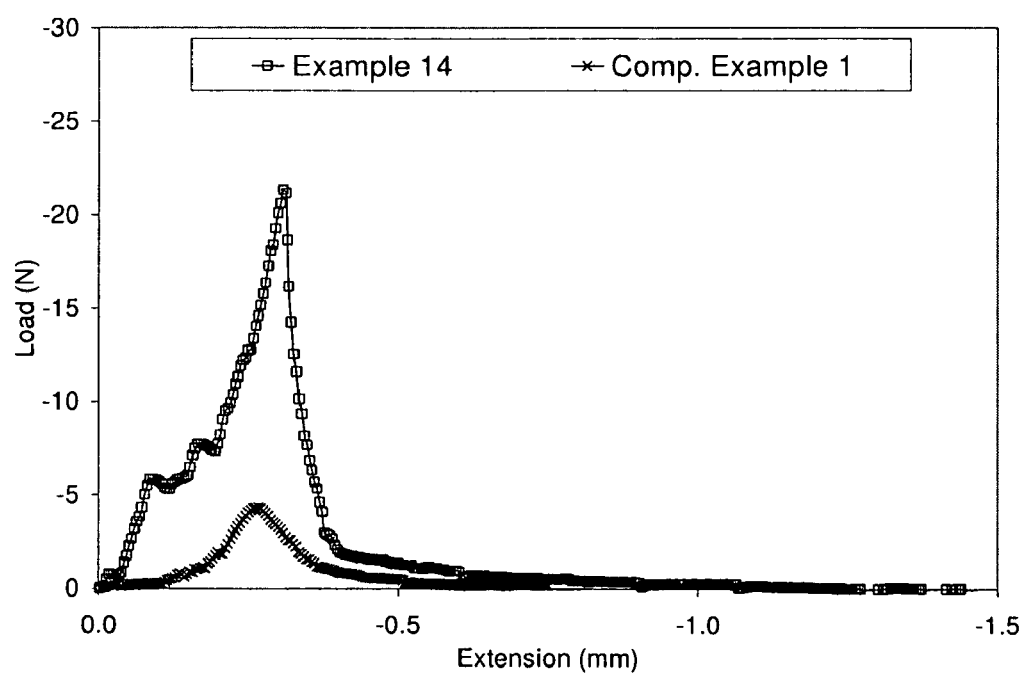

Figure 11. Four-point bend load-displacement plots of Example 15 and Comp. Example 1.
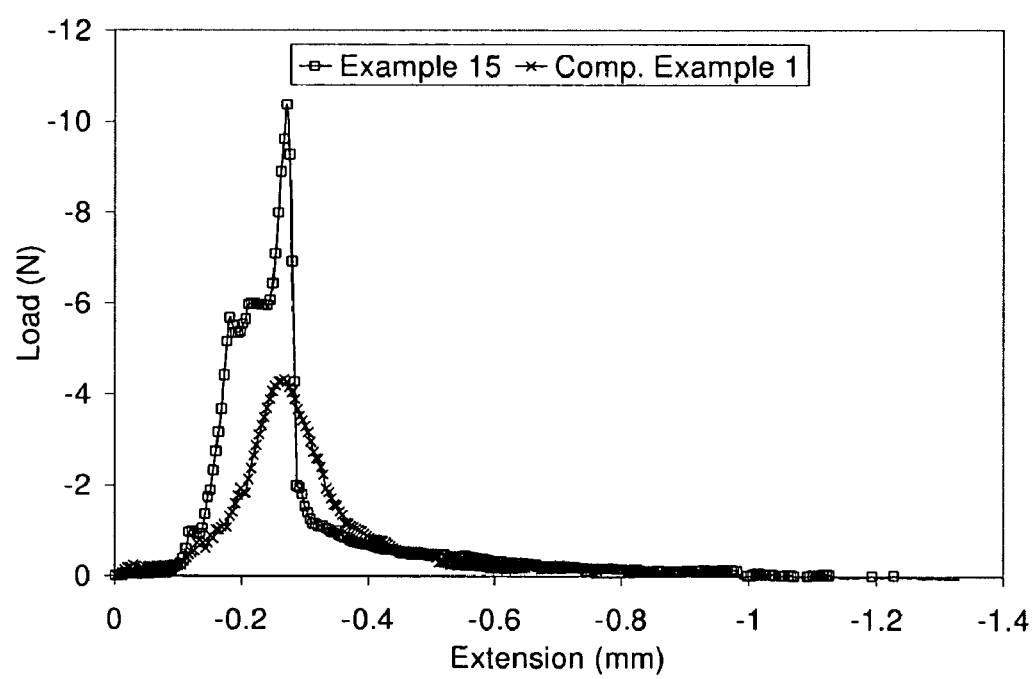

Figure 12. Four-point bend load-displacement plots of Example 16 and Comp. Example 1.
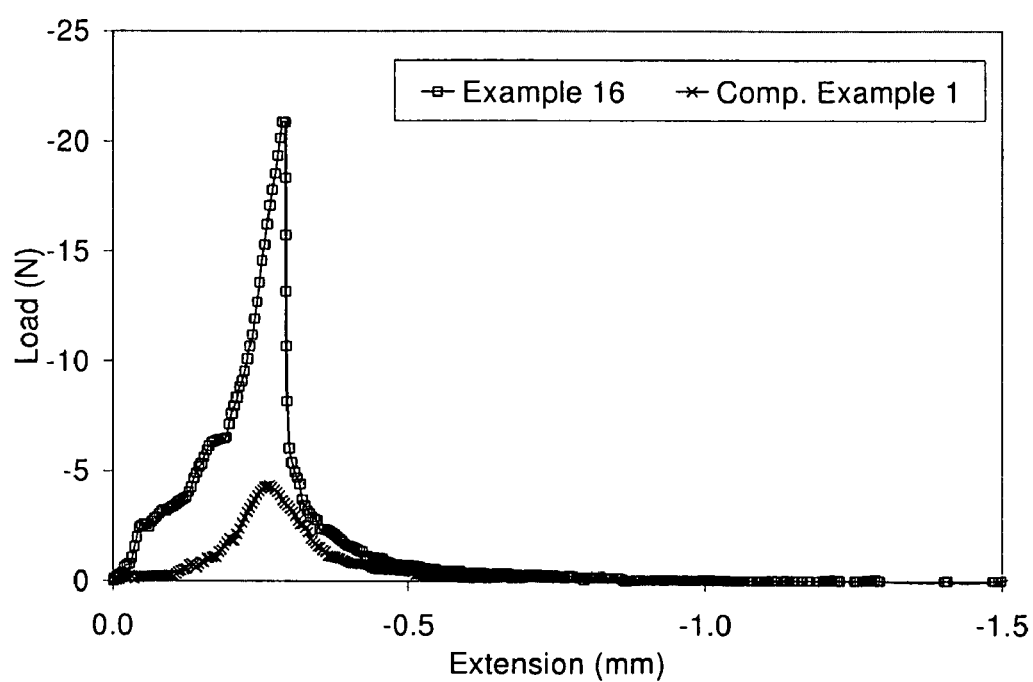

Figure 13. Scanning Electron Micrograph of a fracture surface of the cement of Comparative Example 1.
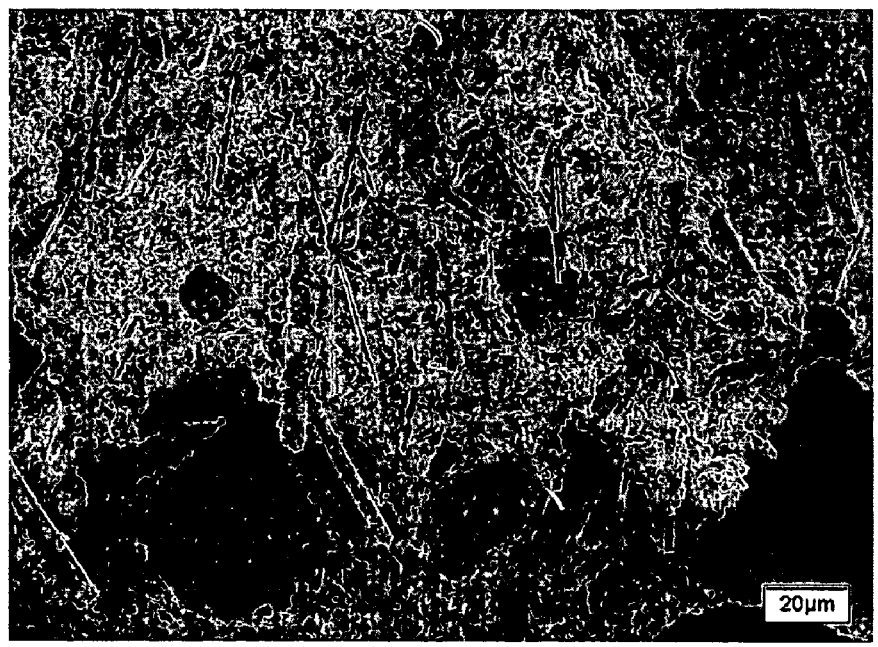

Figure 14. Scanning Electron Micrograph of a fractured surface of the cement of Example 14.
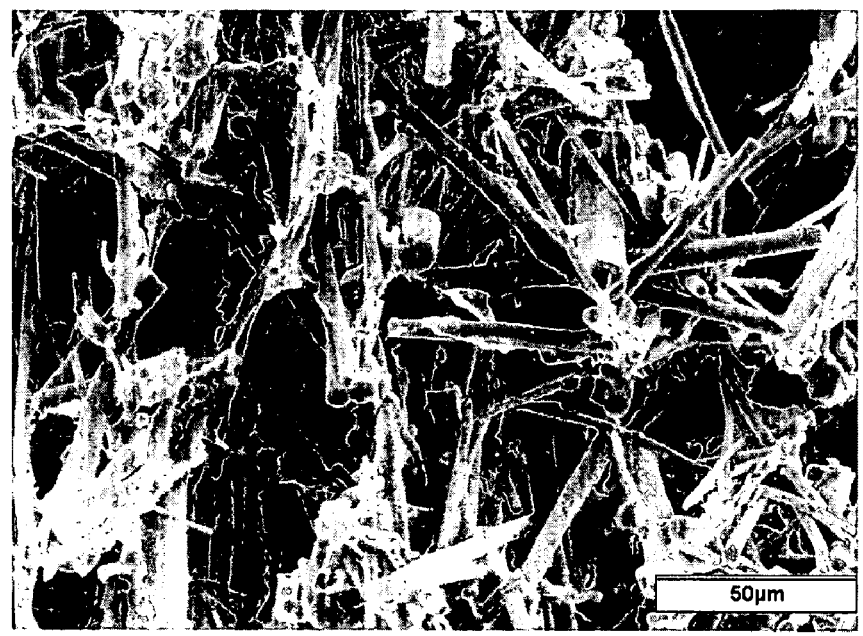

Figure 15. Load-displacement plots of Comparative Examples 2 and 3 cemented segments.
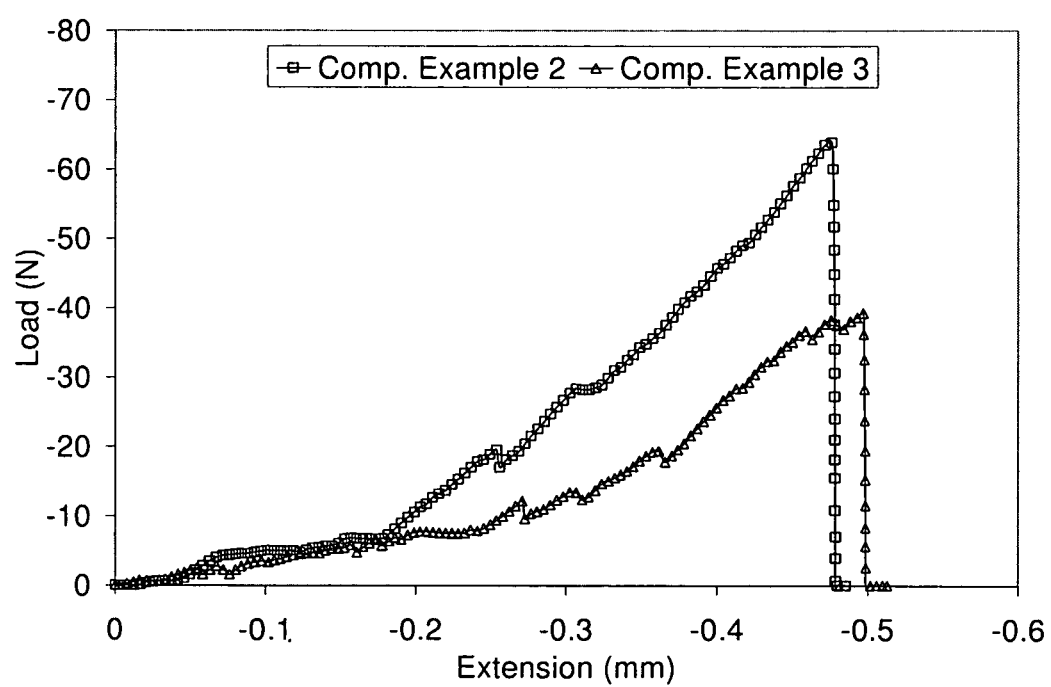

CEMENT TO MAKE THERMAL SHOCK RESISTANT CERAMIC HONEYCOMB STRUCTURES AND METHOD TO MAKE THEM

CLAIM OF BENEFIT OF FILING DATE

The present application claims the benefit of the filing date of U.S. application Ser. No. 61/038,266, filed Mar. 20, 2008, which is hereby incorporated by reference for all purposes.

FIELD OF THE INVENTION

The present invention relates to a ceramic filter having improved thermal shock resistance and method to make them. In particular, the filter and method relate to the use of an improved ceramic cement for assembling ceramic particulate filters together to make a larger thermal shock resistant filter.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger, Diesel soot presents to health collides with the need for greater fuel efficiency that Diesel engines provide, regulations have been enacted curbing the amount of Diesel soot permitted to be emitted. To meet these challenges, soot filters have been used. When using such a filter, the filter must be periodically regenerated by burning off the soot. This burning of soot results in stresses from axial and radial temperature differences that can cause cracking of the filter.

To overcome stresses, ceramic honeycombs such as heat exchangers and filters have reduced the stresses and potential for cracking the honeycombs by assembling smaller honeycombs into larger honeycombs. Cement layers between the honeycombs have been used, for example, to increase the thermal conductivity to reduce the ultimate temperature reached in the assembled honeycomb such as described by EP 1508355. To achieve the improved thermal conductivity, these cements/sealing layers/adhesives have used ceramic particulates to increase the thermal mass/conductivity and ease of application to the smaller honeycomb segments. Often such cements are augmented by the use of the, ceramic fibers, and ceramic binder and organic binder such as described by U.S. Pat. No. 5,914,187 to facilitate application of the cement prior to firing (e.g., reduce segregation of particulates) and improve some mechanical property such as toughness of the cement.

Unfortunately, the use of these augmenting materials results in problems in using the cement or reduced effectiveness. For example, the use of organic binder helps in reducing particle separate of the cement, but then must be removed slowing the process to make the part and also risking damage due to thermal gradients due to combustion of the organics and pressure from evolving gases. The use of fibers also tends to lower the thermal mass and thermal conductivity of the cement layer due to inefficient packing and ability to load the fibers to any great extent into a carrier fluid without excessive viscosity increases.

Therefore, it would be desirable to provide an assembled larger honeycomb from smaller ceramic honeycombs and method to do that avoids one or more problems described above such as removal of organic binder from the assembled filter prior to use.

SUMMARY OF THE INVENTION

One aspect of this invention is a ceramic honeycomb structure comprised of at least two separate smaller ceramic honeycombs that have been adhered together by a cement comprised of inorganic fibers and a binding phase wherein the smaller honeycombs and fibers are bonded together by the binding phase which is comprised of an amorphous silicate, aluminate or alumino-silicate glass and the cement has at most about 5% by volume of other inorganic particles. In a particular, embodiment, a fraction (i.e., less than ½ of the binding phase by volume) has a crystalline phase that has a discontinuous coefficient of expansion. "Discontinuous" means that at a particular temperature or over a small temperature, the crystalline phase converts to another crystallography with a step change in thermal expansion such as quartz-tridymite-christobalite.

Another aspect of the invention is a method of forming a honeycomb structure comprising contacting a first honeycomb segment on at least one of its outer surfaces with a cement comprised of inorganic fibers having an average length between 100 micrometers to 1000 micrometers, a carrier fluid, a colloidal inorganic sol and in the absence of other inorganic particles, wherein the fibers have a solids loading of at least about 10% by volume of the total volume of the cement, mechanically contacting a second honeycomb segment with the first honeycomb segment such that the cement is interposed between said honeycomb segments such that said honeycomb segments are adhered, heating the adhered segments sufficiently to form amorphous ceramic bonding between the fibers of the cement and the honeycomb segments to form the honeycomb structure.

In another aspect, the invention is a method to make a ceramic cement comprising (a) mixing inorganic fibers with a first colloidal sol having negative or positive surface charge and then subsequently; and (b) mixing in to the mixture of step (a) a second colloidal sol having a surface charge opposite that of the first colloidal sol to form the ceramic cement. The cement surprisingly has desirable rheological properties allowing the cement to be easily spread and adhered to ceramic honeycomb segments in the absence of organic binders. In addition, the coefficient of thermal expansion may be matched with various ceramics such as mullite depending on the ratio of the alumina to silica sol in the cement.

In a further aspect, the invention is a ceramic honeycomb structure comprised of at least two separate smaller ceramic honeycombs that have been adhered together by a cement comprised of inorganic fibers comprised of alkaline earth silicate, alkaline earth alumino-silicate or combination thereof wherein the smaller honeycombs and fibers are bonded together by a binding phase comprised of an amorphous silicate, aluminate or alumino-silicate glass.

The ceramic honeycomb structures may be used in any applications requiring resistance to hot gases or liquids such as heat exchangers, catalyst supports and filters (e.g., molten metal and soot filters). The cement may be used to make porous ceramics requiring improved thermal shock resistance such as the aforementioned honeycomb structures.

BRIEF DESCRIPTION OF THE DRAWINGS

FIG. 3 is a graph of the load displacement curves of a four point bend test of honeycomb structures of and not of this invention.

FIG. 4 is a graph of the load displacement curves of a four point bend test of honeycomb structures of this invention where the cement had differing porosities from the use of a nutflour porogen in the cement.

FIG. 5 is a graph of the load displacement curves of a four point bend test of honeycomb structures of this invention with fibers of varying chemistry.

FIG. 6 is a graph of the load displacement curves of a four point bend test of honeycomb structures of this invention with the addition of a small amount of inorganic particulates.

FIG. 7 is a graph of the load displacement curves of a four point bend test of honeycomb structures of this invention having a silicate binder phase and a commercial cemented honeycomb not of this invention.

FIG. 8 is a graph of the load displacement curves of a four point bend test of honeycomb structures of this invention having an aluminate binder phase and zirconium alumino-silicate fiber and a commercial cemented honeycomb not of this invention.

FIG. 9 is a graph of the load displacement curves of a four point bend test of honeycomb structures of this invention having an aluminate binder phase, zirconium alumino-silicate fiber and organic additives and a commercial cemented honeycomb not of this invention.

FIG. 10 is a graph of the load displacement curves of a four point bend test of honeycomb structures of this invention having an aluminate binder phase and magnesium silicate fiber and a commercial cemented honeycomb not of this invention.

FIG. 11 is a graph of the load displacement curves of a four point bend test of honeycomb structures of this invention having an alumino-silicate binder phase and zirconium alumino-silicate fiber and a commercial cemented honeycomb not of this invention.

FIG. 12 is a graph of the load displacement curves of a four point bend test of honeycomb structures of this invention having an alumino-silicate binder phase, zirconium alumino-silicate fiber and organic additives and a commercial cemented honeycomb not of this invention.

FIG. 13 is the scanning electron micrograph of the fractured surface of a cement of a honeycomb structure not of this invention.

FIG. 14 is the scanning electron micrograph of the fractured surface of a cement of a honeycomb structure of this invention.

FIG. 15 is a graph of the load displacement curves of a four point bend test of honeycomb structures not of this invention, which were made using commercial ceramic cements.

DETAILED DESCRIPTION OF THE INVENTION

Honeycomb Structure

Figure 1:
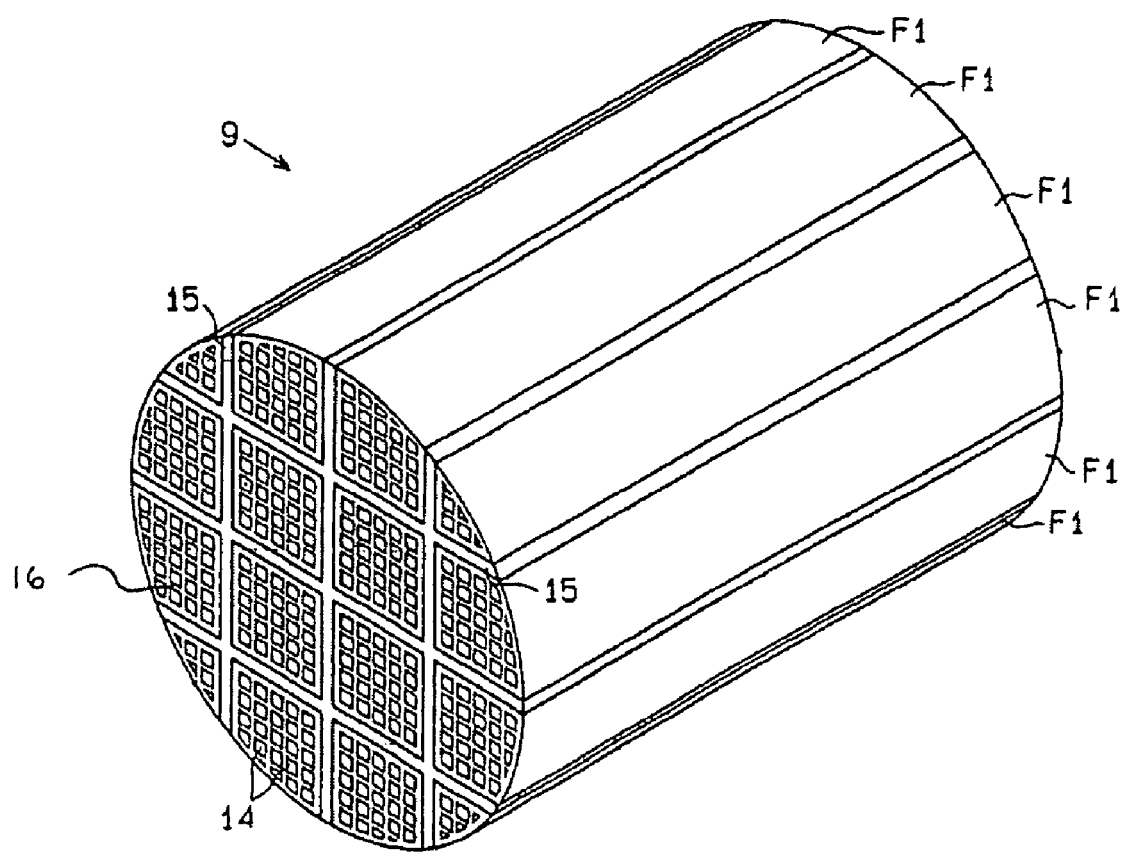
FIG. 1 is a perspective view of the honeycomb structure of this invention.

The smaller ceramic honeycombs F1 (i.e., honeycomb segments) may be any suitable porous ceramic, for example, such as those known in the art for filtering Diesel soot. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. No. 6,669,751B1 and WO publications EP1142619A1, WO 2002/070106A1. Other suitable porous bodies are described by U.S. Pat. Nos. 4,652,286; 5,322,537; WO 2004/011386A1; WO 2004/011124A1; US 2004/0020359A1 and WO 2003/051488A1.

The mullite is preferably a mullite having an acicular microstructure. Examples of such acicular ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The ceramic making up the honeycomb segments F1, generally, has a porosity of about 30% to 85%. Preferably, the porous ceramic has a porosity of at least about 40%, more preferably at least about 45%, even more preferably at least about 50%, and most preferably at least about 55% to preferably at most about 80%, more preferably at most about 75%, and most preferably at most about 70%.

The segments F1 in the honeycomb structure 9 may be any useful amount, size, arrangement, and shape such as those well known in the ceramic heat exchanger, catalyst and filter art with examples being described by U.S. Pat. Nos. 4,304,585; 4,335,783; 4,642,210; 4,953,627; 5,914,187; 6,669,751; and 7,112,233; EP Pat. No. 1508355; 1508356; 1516659 and Japanese Patent Publ. No. 6-47620. In addition, the segments F1 may have channels 14 with any useful size and shape as described in the just mentioned art and U.S. Pat. Nos. 4,416,676 and 4,417,908. The thickness of the walls 16 may be any useful thickness such as described in the aforementioned and U.S. Pat. No. 4,329,162.

The thickness of the cement layer 15 may be any useful thickness such as described in the art of the first sentence of the previous paragraph. The cement may be continuous or discontinuous (an example of discontinuous being described in U.S. Pat. No. 4,335,783). Typically the thickness of the cement layer 15 is from about 0.1 mm to about 10 mm. Typically, the thickness of the layer is at least 0.2, 0.5, 0.8 or 1 mm to at most about 8, 6, 5, 4 or 3 mm.

The cement layer may have a porosity that varies widely, but it is generally between about 20% to 90% porous. Typically, the porosity is at least about 25%, 30%, 35%, 40%, 45% or 50% to at most about 85%, 80%, 75% or 70%.

The segments F1 are adhered together by the cement 15. The cement 15 is comprised of inorganic fibers. In one embodiment the fibers have an average length, by number, of 100 to 1000 micrometers wherein the segments and fibers are bonded together by a binding phase comprised of an amorphous glass. Surprisingly, the length of the fiber may be over 100 micrometers to create a cement with excellent ability to withstand thermal shock that may occur in regenerating soot filters. This is so even though no other inorganic particulates are added to increase the thermal mass or thermal conductivity.

Typically the fiber average length is at least about 100, 150, 200 or 225 micrometers to at most about 900, 800, 700, 600, 500 or 400 micrometers. In addition, even though the distribution of the length of the fibers may be wide, typically at least about 50%, 60%, 70%, 75%, 80%, 85%, 90%, 95% to essentially all (e.g., less than 1% of the fibers) of the fibers have a length between 100 to 1000 micrometers. Surprisingly, when using such fiber lengths, a honeycomb structure with excellent thermal shock resistance may be made without the use of other inorganic particles in the cement layer.

Other inorganic particles, generally, mean particles that have a size of at least about 0.2 micrometer to at most about 250 micrometers in diameter and aspect ratio of at most about 10 and generally are crystalline. These particles also do not, in any meaningful way contribute to the bonding of the fibers or segments together, but may be bound together with the fibers and segments by the binding phase. Examples of such other inorganic particles are alumina, silicon carbide, silicon nitride, mullite, cordierite and aluminum titanate.

Generally, the fiber diameter of the fibers is from about 0.1 micrometer to about 20 micrometers. The fiber diameter may be at least about 0.2, 0.4, 0.6, 0.8, 1, 2 or 4 micrometers to at most about 18, 15, 12, 10 or 8 micrometers.

The fibers may be any useful inorganic fibers such as those known in the art. The fiber may be amorphous or crystalline or combination thereof. The fiber may be amorphous to start and upon heating or use during operation, for example, in a Diesel particulate trap, crystallize to some extent such as described in U.S. Pat. No. 5,322,537. Generally, the fiber is an amorphous silicate or aluminosilicate fiber that may be crystallized to form or have, for example, mullite crystals within the fiber and surrounded by glass. The fiber may also contain other compounds such as rare earths, zirconium, alkaline earths in significant volumes (i.e., greater than 1% by mole and preferably at least about 2%, 3%, 4%, 5%, 7%, or 10% to at most about 40% by mole). Particular examples are aluminosilicate fibers available under the tradename FIBERFRAX, from Unifrax LLC, Niagara Fall, N.Y.; alkaline earth fiber (Mg-silicate fiber) under the tradename ISOFRAX also available from Unifrax and SAFFIL (e.g., SAFFIL RF) alumina fibers available from Saffil LTD. Cheshire, UK.

In a particular embodiment, the fiber is an alkaline earth alumino silicate, alkaline earth silicate or combination thereof. In particular the alkaline earth is Mg, Ca or combination thereof. Preferably the fiber is a silicate of Mg, Ca or combination thereof, even more preferably the Mg-silicate. Surprisingly, this type of fiber even though it has a lower strength than typical alumino-silicate fibers may be used because it is not abraded by particulates put in the cement to increase thermal mass of the cement and apparently the toughening does not arise from fiber pullout from the particulates cemented together. These cements also have an advantage in that they are less hazardous than the typical alumino-silicate cements. A particular example, to reiterate, is ISOFRAX mentioned above.

In general, the amorphous phase binding phase is an aluminate, silicate or aluminosilicate. "Amorphous" means that there is no molecular structure that is detectable using typical analytical techniques. That is, there may be some very small ordered structure, but due to the size of such order, the techniques to measure such order, for example, fails to detect or is not substantially different than an amorphous material. For example, the ordered domains may be of such a small size that X-ray diffraction or electron diffraction results in such diffuse scattering that if such domains were present they would be of a size of at most about 50 to 100 nanometers.

In a particular embodiment, a crystalline phase that has a discontinuous thermal expansion coefficient is incorporated into the amorphous binding phase in a volume percentage, generally, of at most about 40% by volume of the amorphous binding phase. "Discontinuous thermal expansion coefficient" means that the phase may undergo a reversible crystalline rearrangement to form a new crystalline structure such as quartz, tridymite or christobalite, which are differing crystalline forms of silica. Generally, when such phases are incorporated into the amorphous binding phase, they are present in domains that are at most a few micrometers and typically less than about 1 micrometer but more than about 100 nanometers. When such a discontinuous phase is present it is, typically, present at a volume percentage of at least about 1%, 2%, 3%, 4% or 5% to at most about 35%, 30%, 25% or 20% of the volume of the amorphous binding phase. The amount may be determined by known X-ray and electron microscopy analytical techniques.

Method of Making the Honeycomb Structure

In making the honeycomb structure of this invention, a cement is made with the fibers described above. To achieve the desired size and distributions of fibers, the fibers are first comminuted by any suitable means such as ball/pebble milling, attrition, jet milling or the like at conditions readily determined by one of ordinary skill in the art for the particular technique.

Illustratively, commercially available fibers such as FIBERFRAX or ISOFRAX described above are milled dry in a ball mill using ceramic media such as zircon, alumina, quartz pebbles, zirconia or any other milling media that would not introduce detrimental impurities.

The impurities that are introduced generally are trace amounts and would appear in the cement in a total % by volume of less than about 1% by volume the inorganic fiber and amorphous binding phase of the cement (i.e., inorganic fraction). In other words, the amount of any other inorganic particles in the cement generally is desired to be less than 1% by volume of the inorganic fraction of the cement, which would arise only from impurities arising from the milling of the fibers or making of the cement. Generally, the amount of any other inorganic particles is at most 0.75%, 0.5%, 0.25%, 0.1% or essentially undetectable in the cement by volume of the inorganic fraction. If desired, however, the cement may have a small volume of inorganic particles, so long as the amount does not interfere with bonding of the fibers to other fibers along their lengths. Generally this means, that at most 5% by volume of other inorganic particles are present.

The fibers of the proper length are then typically mixed with amorphous colloidal inorganic particles in a carrier fluid to make a cement. When making the cement, the fiber fraction must be sufficiently present to make a useful cement and typically this is when there is a fiber loading of at least about 10% by volume of the total volume of the cement (the inorganic fraction, carrier fluid and any other organic additives). If an insufficient loading of fibers are present, then there typically is insufficient strength developed to handle and process the honeycomb structure, for example, into an exhaust system without an elevated probability of breakage. Typically the fiber loading is at least about 11%, 12%, 13%, 14%, 15%, 16%, 17%, 18%, 19% or 20% to at most about 70%, 60%, 50%, 40%, or 30%.

"Colloid" herein means a particulate having an average particle size of less than 1 micrometer by number. The colloid may be crystalline or amorphous, but when the colloid is crystalline it decomposes upon heating to at least form an amorphous binding phase described herein. Preferably, the colloid is amorphous. The colloid is preferably a silicate, aluminate and aluminosilicate sol. Desirably, the colloid is a cation (alkali or ammonium) stabilized or combination thereof silicate stabilized sol, which are commonly referred to as silica colloids or silica sols that have a basic pH. The surface charge of these silica colloids are negative as determined by known electrophoretic techniques. When the sol is an alumina sol/colloid, it desirably is a sol having an acidic pH, where the alumina particles have a positive charge as determined by electrophoretic techniques. Illustrative colloids such as those known in the art and available under the tradenames such as KASIL and N, PQ Corporation, PO Box 840, Valley Forge, Pa.; ZACSIL, Zaclon Incorporated, 2981 Independence Rd., Cleveland, Ohio; Sodium Silicates, Occidental Chemical Corporation, Occidental Tower, 5005 LBJ Freeway, Dallas, Tex.; NYACOL Nexsil colloidal silica and A120 colloidal aluimina, Nyacol Nanotechnologies Inc., Ashland Md. and Aremco 644A and 644S, Aremco Products Inc., Valley Cottage, N.Y.

The carrier liquid may be, for example, water, any organic liquid, such as an alcohol, aliphatic, glycol, ketone, ether, aldehyde, ester, aromatic, alkene, alkyne, carboxylic acid, carboxylic acid chloride, amide, amine, nitrile, nitro, sulfide, sulfoxide, sulfone, organometallic or mixtures thereof. Preferably, the carrier fluid is water, an aliphatic, alkene or alcohol. More preferably, the liquid is an alcohol, water or combination thereof. When an alcohol is used, it is preferably methanol, propanol, ethanol or combinations thereof. Most preferably, the carrier fluid is water.

The total amount of carrier fluid that is used may vary over a wide range depending on other organic additives such as those described below and the solids loading of the fiber and the technique used to contact the segments together. The total amount of water generally is at least about 40% by volume to at most about 90% of the inorganic fraction of the cement.

The cement may contain other useful components, such as those known in the art of making ceramic pastes. Examples of other useful components include dispersants, deflocculants, flocculants, plasticizers, defoamers, lubricants and preservatives, such as those described in Chapters 10-12 of Introduction to the Principles of Ceramic Processing, J. Reed, John Wiley and Sons, N.Y., 1988. When an organic plasticizer is used, it desirably is a polyethylene glycol, fatty acid, fatty acid ester or combination thereof.

The cement may also contain binders. Examples of binders include cellulose ethers, such as those described in Chapter 11 of Introduction to the Principles of Ceramic Processing, J. Reed, John Wiley and Sons, NY, N.Y., 1988. Preferably, the binder is a methylcellulose or ethylcellulose, such as those available from The Dow Chemical Company under the trademarks METHOCEL and ETHOCEL. Preferably, the binder dissolves in the carrier liquid.

The cement may also contain porogens. Porogens are materials specifically added to create voids in the cement after being heated to form the amorphous phase. Typically these are any particulates that decompose, evaporate or in some way volatilize away during the heating to leave a void. Examples include flour, wood flour, carbon particulates (amorphous or graphitic), nut shell flour or combinations thereof.

In a particular embodiment, the cement is made in the absence of organic constituents other than the carrier fluid if it is an organic solvent such as an alcohol. Preferably, when making this cement embodiment, the carrier fluid is water. In a preferred embodiment of this embodiment, the cement is made by mixing the fibers with a colloid having a particular surface charge (e.g., silica colloid having a negative surface charge such as in basic water) within the carrier fluid until a good mixture is formed and then subsequently adding or mixing in a second colloid having an opposite charge (e.g., alumina colloid having a positive surface charge such as in acidic water) to form the cement. Surprisingly, this method results in a cement having excellent shear thinning rheology, which limits any segregation of the components of the cement and allows for easy application on the segments by known methods for applying such pastes (e.g., spraying, smearing, puttying, and any other suitable technique involving applying a shear to the paste and contacting it with the outer surface of the segment).

The cement, generally and desirably has a shear thinning behavior. "Shear thinning" means that the viscosity at a higher shear rate is lower than the viscosity at a lower shear rate. Illustratively, the viscosity at a low shear rate (i.e., about $5\ s^{-1}$) is typically at least about 5, 10, 25, 50, 75 or even 100 Pa·s, and the viscosity at high shear (i.e., about $200\ s^{-1}$) is typically at most about 1, 0.5, 0.1, 0.05, or even 0.01 Pa·s. Such viscosity measurements may be made by rheometers for measuring such cements at such shear rates and viscosities as the one described herein.

Surprisingly the CTE of the cements of the present invention may be substantially different than the CTE of the segments (CTE=coefficient of thermal expansion). For example when the segment is mullite (CTE~5.5 ppm/° C.) cements having a CTE of ~8 ppm/° C. (e.g., use of alumina sol as the sole binder with a mg-silicate fiber) are as effective in reducing thermal shock without any degradation to the honeycomb structure as cements with almost matching CTEs. This allows for one cement to be used on multiple differing segments and even allows for segmenting of segments of differing composition and CTE's. In a particular embodiment, the segments are mullite and the colloids used to form the cement are a mixture of silica and alumina such that thermal expansion coefficient is within the 10% of the mullite thermal expansion. Illustratively, when a mixture of silica and alumina sols are used, the weight ratio of the silica to alumina of the colloidal sols may be any useful ratio such as 1:99 to 99:1. Desirably the ratio is 5:95, 10:90, 20:80:30:70, 40:60, or 50:50 or their inverses.

After a segment or segments is contacted on its outer surface with the cement, the segment are contacted with the cement interposed between the segments by any suitable method of doing so. In a particular embodiment, the segments are first exposed to neat carrier fluid so that they are wet when the cement (paste) is contacted to the surface. In a particular embodiment, the just mentioned wetting of the carrier fluid is advantageously done using a colloidal sol such as one used to make the ceramic cement. In this embodiment, the colloid is present throughout each of the segments and has been surprisingly found to be useful in trapping liquid particulate fractions of soot emitted from a Diesel engine. The colloidal sol may be introduced into the segments of the honeycomb structure after the honeycomb structure has been made. The method used may be suitable for applying a fluid, such as dipping, spraying, injecting, brushing or combination thereof. The sol may be any one of those already described herein.

Illustratively, the segments, if having a square cross-section, may be held in a template and the cement squirted or injected in the gaps between the segments. The segments have the cement deposited the desired outer surface, such as fitting a corner into an incline plane and building up from this first square in whatever pattern desired. The incline plane may, if desired have spacers also built in so that the first layer of segments has equidistant spacing resulting in more uniform cement layer thickness. Alternatively, the segments may be placed on a flat surface and built up in a manner similar to brick masonry.

Once the segments are adhered, the carrier fluid is removed by heating or any suitable method, which may include just ambient evaporation or any other useful method such as those known in the art. The removal may also occur during the heating to form the amorphous binding of the fibers and the segments. Heating may also be used to remove any organic additives in the segments or cement. This heating may be any suitable such as those known in the art and may also occur during the heating to form the amorphous binding of the fibers and segments together. To create the amorphous binding phase, the heating should not be so high a temperature that crystallization occurs in the fiber (unless desired) or amorphous binding phase, sagging honeycomb structure or migration of the glass binding phase to an extent that is deleterious to the performance of the honeycomb structure. Typically, the temperature is at least about 600° C., 650° C., 700° C., 750° C. or 800° C. to at most about 1200° C., 1150° C., 1100° C., 1050° C. or 1000° C.

Test Methods

Figure 2:
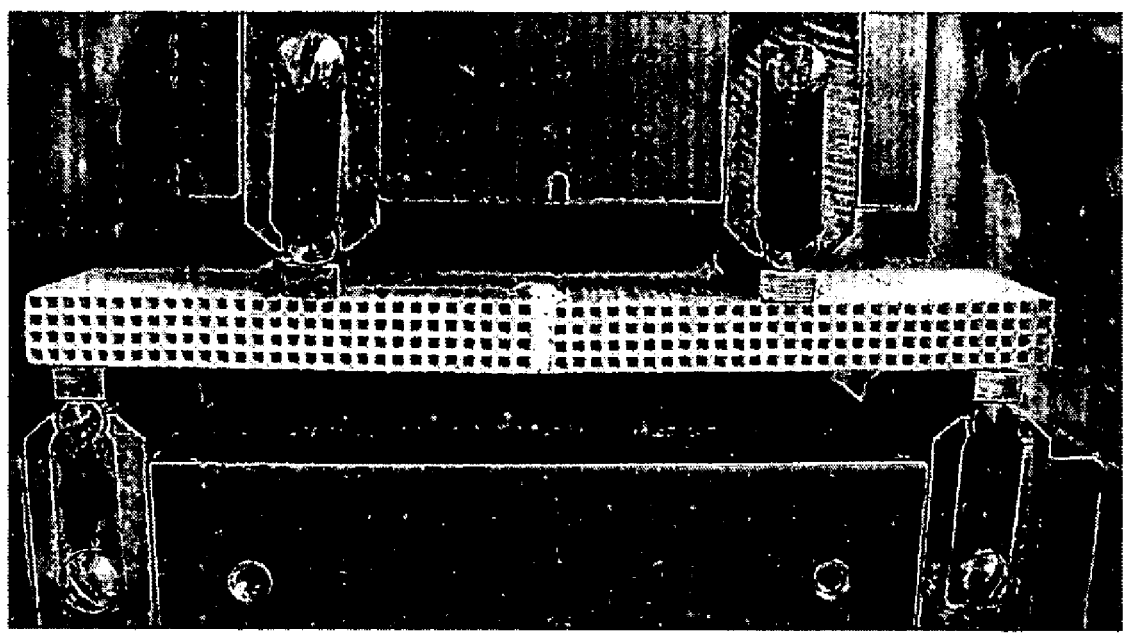
FIG. 2 is picture of the four point bend test used to determine the bending load displacement of cemented together ceramic segments.

Four point bending: Two honeycomb segments of about 50 mm×20 mm×7.5 mm are cemented together and tested as shown in the photograph in FIG. 2. The upper span is 40 mm and the lower span is 80 mm. Using an Instron 5543 Load Frame was run using a speed of 0.02 inch/minute and the load data recorded versus displacement.

Average fiber length: The average fiber length was determined on a number of fibers (e.g., 100-200) in a scanning electron microscope Viscometry: Cement viscosity was determined using an AR G2 Rheometer (TA Instruments, New Castle, Del.) with a Couette with small vaned rotor fixture. The temperature was controlled at 20±1° C. and the humidity was in the range of 50±2%.

EXAMPLES

Example 1

33 wt % of milled aluminum zirconium silicate fiber (milled fiber available from Unifrax LLC, Niagara Falls, under the product name Long Staple Fine fiber, 67 wt % of colloidal silica, available from Aremco Products Inc., Valley Cottage, N.Y., under the product name Cerama-Bind 644S (40 wt % silica solid content in water) were mixed together by hand until the fibers appear uniformly dispersed (~1 minute). The fiber had a fiber length ranging from about 100-500 micrometers and diameter ranging from about 4-8 micrometers. The cement was applied onto the surfaces of mullite segments of the size described in the four point bend test. The mullite segments were cut from a larger mullite honeycomb, which was made by a process essentially the same as described by Example 4 of WO 03/082773A1 (including heat treating to 1400° C. as also described in Example 4 of WO 03/082773A1). Prior to the cement being applied, the honeycomb segments were submersed into water and excess water shaken off. The cement was applied to each segment and the segments contacted by hand to adhere them together. The segments were then air dried for overnight. After drying, the adhered segments were heated to 1100° C. and held for two hours and cooled to form the cemented honeycomb.

The cement was highly porous (about 60%-65% porosity) with fiber being bonded at multiple points along the fiber by an amorphous silica binding phase. Four point bend testing of this Example was performed with the load displacement curve being shown in FIG. 3.

Examples 2-5

A cemented honeycomb was made by the same procedure as in Example 1 except that methyl cellulose (METHOCEL A15LV, available from The Dow Chemical Co. Midland, Mich.) was added in an amount of about 2 parts and nutflour (GLUFIL Products WF-7, available from AGRASHELL INC, Los Angeles, Calif.) was added in an amount of 0 (Example 2), 10 (Example 3), 20 (Example 4), and 50 (Example 5) parts by weight of the fiber. The addition of organic binders or porogens changes the processing and application characteristics of the cement while maintaining fracture resistance even though the porosity of the cement is increased, as illustrated by the four-point bend testing load curves of these Examples, which are shown in FIG. 4.

Example 6

A cemented honeycomb was made by the same procedure as in Example 1 except that alumina fiber (SAFFIL RF alumina fibers, 3-6 micrometers in diameter and length ranging from about 100-500 micrometers, available from Saffil LTD. Cheshire, UK.) was used. In addition the amount of the components was 54 wt % fiber, 40 wt % of colloidal silica, available from Aremco Products Inc., Valley Cottage, N.Y., under the product name Cerama-Bind 644S (40 wt % silica solid content in water), and 6 wt % of nutflour (GLUFIL Products WF-7, available form AGRASHELL INC, Los Angeles, Calif.) were mixed to achieve cement with uniformly dispersed fiber and binders. Four point bend testing was performed on this Example with the load displacement curve being shown in FIG. 5.

Example 7

A cemented honeycomb was made by the same procedure as in Example 5 except that the fiber used was aluminum silicate fiber (FIBERFRAX 7000 Spun Fibers, 3-5 microns in diameter and length ranging from about 100-500 microns, available from Unifrax LLC, Niagara Fall, N.Y.). Four point bend testing was performed on this Example with the load displacement curve being shown in FIG. 5.

Example 8

A cemented honeycomb was made by the same procedure as in Example 5 except that the fiber used was aluminum zirconium silicate fiber (FIBERFRAX Long Staple Fine fibers, 4-8 micrometers in diameter and length ranging from about 100-500 micrometers, available from Unifrax LLC, Niagara Falls, N.Y.). Four point bend testing was performed on this Example with the load displacement curve being shown in FIG. 5.

Example 9

A cemented honeycomb was made by the same procedure as in Example 1 except that the following ingredients and amounts were used. 31 wt % of the milled FIBERFRAX Long Staple Fine fibers, 62 wt % of the Cerama-Bind 644S silica binder, 1 wt % methyl cellulose (METHOCEL A15LV, available from The Dow Chemical Co. Midland, Mich.), and 6 wt % of Kappa alumina inorganic particulates (1-5 micrometers in size, available from Ceramiques Techniques & Industrielles, Salindres, France) were mixed together to prepare the cement. Four-point bend testing was performed on this Example with the load displacement curve being shown in FIG. 6.

Example 10

A cemented honeycomb was made by the same procedure as in Example 9, except that the inorganic particles used were zirconia, 99+%, (metals basis excluding Hf, $HfO_2$ 2%), −325 mesh available from Alfa Aesar, a Johnson Mathey Co., Ward Hills Mass. Four point testing was performed on this Example with the load displacement curve being shown in FIG. 6.

Example 11

38 wt % of milled magnesium silicate fiber (ISOFRAX fibers, 4-5 micrometers in diameter and length ranging from about 100-500 micrometers, available from Unifrax LLC, Niagara Falls, N.Y.), 56 wt % of colloidal silica (Nexsil 12 aqueous colloidal silica, available form Nyacol Nano Technologies, Inc, Ashland, Mass.), 3 wt % methyl cellulose (METHOCEL A15LV, available from The Dow Chemical Co. Midland, Mich.), and 3 wt % polyethylene glycol 400, available from Alfa Aesar were mixed to achieve uniform mixture. The cement was applied directly onto dry mullite segments cut from a large mullite honeycomb in same manner as Example 1. The four-point bend was performed on this Example with load-displacement curve being shown in FIG. 7.

Example 12

33 wt % of milled aluminum zirconium silicate fiber, FIBERFRAX Long Staple Fine fibers as used in Example 1, 67 wt % of colloidal alumina, available from Aremco Products Inc., Valley Cottage, N.Y., under the product name Cerama-Bind 644A (30 wt % alumina solid content in water) were mixed together until the fibers were uniformly dispersed. A cemented honeycomb was made in the same manner as in Example 1 for four-point bend testing. The load displacement curve of this Example is shown in FIG. 8.

Example 13

37 wt % of milled aluminum zirconium silicate fiber, FIBERFRAX Long Staple Fine fibers as used in Example 1, 59 wt % of colloidal alumina, available from Aremco Products Inc., Valley Cottage, N.Y., under the product name Cerama-Bind 644A (30 wt % alumina solid content in water), 2 wt % methyl cellulose (METHOCEL A15LV, available from The Dow Chemical Co. Midland, Mich.), and 2 wt % polyethylene glycol 400 (Alfa Aesar) were mixed together until the fibers were uniformly dispersed. A cemented honeycomb was made in the same manner as in Example 1 for four-point bend testing. The load displacement curve of this Example is shown in FIG. 9.

Example 14

42 wt % of milled magnesium silicate fiber as used in Example 11, 13 wt % of colloidal alumina (AL20SD, available form Nyacol Nano Technologies, Inc, Ashland, Mass.), 41 wt % of water, 2 wt % methyl cellulose (METHOCEL A15LV, available from The Dow Chemical Co. Midland, Mich.), and 2 wt % polyethylene glycol 400 (Alfa Aesar) were mixed to achieve uniform mixture. The cement was applied directly onto mullite segments cut from a large mullite honeycomb in the same manner as in Example 11. The four-point bend load-displacement curve is shown in FIG. 10. The average viscosity of three measurements run in succession (viscosity plots versus shear rate) of the cement at a shear rate of about 5 s$^{-1}$ was 12.28 Pa·s with a standard deviation of 4.25 and an average viscosity at about a 200 s–1 of 0.036 Pa·s with a standard deviation of 0.038. In the measuring of the three measurements, the viscosity steadily increased, which is believed to be due to the presence of the organic binder coupled with the shear and evaporation of some of the water. In addition, the last high shear measurement was not made because of the increasing viscosity.

Example 15

37 wt % of milled aluminum zirconium silicate fiber, FIBERFRAX Long Staple Fine fibers as used in Example 1 and 49 wt % of colloidal alumina, available from Aremco Products Inc., Valley Cottage, N.Y., under the product name Cerama-Bind 644A (30 wt % alumina solid content in water) were mixed to achieve a uniform mixture. 15 wt % of colloidal silica, available from Aremco Products Inc., Valley Cottage, N.Y., under the product name Cerama-Bind 644S (40 wt % silica solid content in water) was then added into the mixture and mixed until a uniform mixture was prepared. The cement was applied directly onto mullite segments cut from a large mullite honeycomb in the same manner as in Example 11. The load displacement curves of the cemented segments four point bend plots are shown in FIG. 11. The average viscosity of three measurements run in succession (viscosity plots versus shear rate) of the cement at a shear rate of about 5 s$^{-1}$ was 10.37 Pa·s with a standard deviation of 2.95 and an average viscosity at about a 200 s–1 of 0.05 Pa·s with a standard deviation of 0.1. The cement of this Example did not display the time dependent increase in viscosity of the cement of Example 14, which may be useful in allowing for extended working times when applying the cement to the segments.

Example 16

Example 16 is the same as Example 15, except that organic binders were added into the initial mixture having (alumina colloid and fibers) and the following ingredients and amounts were used. 34 wt % of milled aluminum zirconium silicate fiber (FIBERFRAX Long Staple Fine fibers), 56 wt % of colloidal alumina (Cerama-Bind 644A), 2 wt % methyl cellulose (METHOCEL A15LV), and 2 wt % polyethylene glycol 400 were mixed to achieve uniform mixture. 6 wt % of colloidal silica Cerama-Bind 644S was then added into the mixture to form a cement used to cement mullite segments as in Example 11. The load displacement curve of this Example is shown in FIG. 12.

Comparative Example 1

The Comparative Example 1 samples were cut directly from an NGK SiC honeycomb labeled MSC-111 (NGK, Nagoya, Japan) for four point bend testing. The load displacement curve is shown in comparison in FIGS. 3 and 7-12. In the cement of these Comparative Examples, the fibers are embedded in a matrix of inorganic particulates as shown in FIG. 13.

The improved energy absorption and extension before final break (tail of the curve) over Comparative Example 1 of the present invention, which is shown in FIGS. 3 and 7-12 is believed to be due to the present invention's use of bonded fiber network without a matrix of particulate material. This causes the fibers to be bonded at many points along the fiber as shown in FIG. 14 resulting in a surprisingly advantaged fracture compared to the fracture of the Comparative Example 14.

Comparative Example 2

Saureisen Chemical Set 12 is a zircon particulate based cement, available from Saureisen, Pittsburg, Pa. This cement after heating, as per the company's literature, had a CTE of 5.6 ppm/° C. This cement was used to make segments in the same manner as in Example 1. The load displacement curve of the cemented segments is shown in FIG. 15.

Comparative Example 3

Cemented segments were made and tested in the same way as in Comparative Example 2, except that the ceramic cement that was used was Cotronics 901, a alumina based cement reinforced with a small amount of fibers, available from Cotronics Corp., Brooklyn, N.Y. The cement after being heated, as per the company's literature, had a CTE of 7.2 ppm/° C. The load displacement curve of the cemented segments is shown in FIG. 15.

As is clear from the load displacement curves for Comparative Examples 2 and 3, they break in a brittle mode (no tail after the peak load is reached). This fracture is not desired, because it may cause fracture of the segments themselves if a crack propagates due to thermal stresses, for example, in a Diesel particulate filter.

What is claimed is:

1. A ceramic honeycomb structure comprised of at least two separate smaller ceramic honeycombs that have been adhered together by a cement comprised of inorganic fibers and a binding phase wherein the smaller honeycombs and fibers are bonded together by the binding phase which is comprised of an amorphous silicate, aluminate or alumino-silicate glass and the cement has at most about 5% by volume of other inorganic particles and the inorganic fibers have an average length by number from 100 micrometers to 1000 micrometers, wherein the binding phase has therein a crystalline phase that has a discontinuous thermal expansion coefficient from 0° C. to 1400° C.

2. The ceramic honeycomb structure of claim 1, wherein the inorganic fibers have a length distribution such that at least 90% of the fibers have a length between 100 to 1000 micrometers.

3. The ceramic honeycomb structure of claim 1, wherein the cement is in the absence of any other inorganic particles.

4. The ceramic honeycomb structure of claim 3, wherein at least 90% by number of the fibers have a length between 100 micrometers and 1000 micrometers.

5. The ceramic honeycomb structure of claim 4, wherein at least 95% by number of the fibers have a length between 100 micrometers and 1000 micrometers.

6. The ceramic honeycomb structure of claim 1, wherein the average length of the fibers is from 100 to 500 micrometers.

7. The ceramic honeycomb structure of claim 6, wherein the average length is at least 150 micrometers.

8. The ceramic honeycomb structure of claim 7, wherein the average length is at most 400 micrometers.

9. The ceramic honeycomb structure of claim 1, wherein the crystalline phase is quartz, tridymite, christobalite or combination thereof.

10. The ceramic honeycomb structure of claim 1, wherein the fibers are alkaline earth alumino-silicate fibers, alkaline earth silicate or combination thereof.

11. The ceramic honeycomb structure of claim 10, wherein the fibers are alkaline earth alumino-silicate fiber.

12. The ceramic honeycomb structure of claim 11, wherein the alkaline earth of the alkaline earth alumino-silicate fiber is Mg.

13. The ceramic honeycomb structure of claim 12, wherein the smaller honeycombs are comprised of mullite.

14. The ceramic honeycomb structure of claim 13, wherein the smaller honeycombs are acicular mullite.

15. The ceramic honeycomb structure of claim 1, wherein the coefficient of thermal expansion of the cement is within about ten percent (10%) of 5.5 ppm/° C.

16. The ceramic honeycomb structure of claim 1, wherein the fiber contains zirconium.

* * * * *